US012135637B2

(12) United States Patent
Badrinath et al.

(10) Patent No.: US 12,135,637 B2
(45) Date of Patent: Nov. 5, 2024

(54) PRE-SEEDING DATABASES FOR INTEGRATION TESTING

(71) Applicant: Google LLC, Mountain View, CA (US)

(72) Inventors: Srinath Badrinath, Karnataka (IN); Derek Karl Hunter, Redmond, WA (US); Benson Margulies, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/081,247

(22) Filed: Dec. 14, 2022

(65) Prior Publication Data
US 2024/0202102 A1    Jun. 20, 2024

(51) Int. Cl.
G06F 11/36     (2006.01)
G06F 7/08      (2006.01)
G06F 11/14     (2006.01)
G06F 16/23     (2019.01)

(52) U.S. Cl.
CPC ............ G06F 11/3664 (2013.01); G06F 7/08 (2013.01); G06F 11/1469 (2013.01); G06F 16/2358 (2019.01); *G06F 2201/80* (2013.01)

(58) Field of Classification Search
None
See application file for complete search history.

(56) References Cited

U.S. PATENT DOCUMENTS

| 6,549,895 | B1* | 4/2003 | Lai .................... G06F 16/2453 707/999.005 |
| 2002/0007363 | A1 | 1/2002 | Vaitzblit |
| 2004/0117759 | A1 | 6/2004 | Rippert et al. |
| 2005/0147621 | A1* | 7/2005 | Higgins ............ A61K 39/0208 435/69.3 |
| 2020/0125482 | A1* | 4/2020 | Smith .................... G06N 3/045 |
| 2020/0134070 | A1* | 4/2020 | Sidoti ............... G06F 16/24542 |
| 2023/0401274 | A1* | 12/2023 | Denninghoff ...... G06Q 30/0251 |

OTHER PUBLICATIONS

International Search Report and Written Opinion for PCT Application No. PCT/US2023/082489, dated Apr. 8, 2024. 13 pages.

* cited by examiner

*Primary Examiner* — Kim T Nguyen
(74) *Attorney, Agent, or Firm* — Lerner David LLP (57) ABSTRACT

Aspects of the disclosure are directed to pre-seeding test databases in a computing environment for software testing. A system manages a pool of pre-seeded databases to serve user devices with different database requirements for their integration testing needs. Pre-seeded databases can be served more efficiently over empty databases that are populated client-side. From a user perspective, databases appear ready instantly, ready for use as part of testing software using the pre-seeded databases as a stand-in for production data. Pre-seeding databases circumvents the issues of wasted time and potential error that are otherwise possible when databases are served and populated client-side. Pre-seeding data mitigates the need to seed the database during test-time, reducing the integration test cycle for software being tested. Aspects of the disclosure provide for real-time restoration of databases by fixing portions of the database in place instead of outright deletion and recreation of an entire database.

18 Claims, 8 Drawing Sheets

PRE-SEEDING DATABASES FOR INTEGRATION TESTING

BACKGROUND

Integration testing is a type of software testing in which multiple software services or applications are tested together. Some types of services are called microservices and collectively operate as an application. For example, a collection of microservices may collectively function as a user-facing application hosted on a computing platform. When a new or updated microservice is to be added—or integrated—into the application, the collection of microservices and the new microservice may be subjected to various tests. These tests can help developers identify any potential errors arising due to integrating the new or updated microservice to the rest of the microservice collection. Microservices may depend on data generated by other microservices in the application. These dependencies are not always documented or explicitly defined.

A test environment may be deployed as part of performing an integration test. The test environment mirrors conditions in which the application is deployed under production conditions, e.g., conditions in which the application is available to users or is deployed for its intended purpose. To perform accurate tests, the test environment should include databases with test data simulating production data processed by the microservices while in production. A device responsible for performing an integration test may request empty databases on the platform on which the test environment is deployed. Then, the device populates the databases to include test data appropriate for the integration test being performed.

Accurately generating test data tailored for integration testing is a nuanced and computationally expensive task, especially if data is re-generated from an empty database in between test runs. Test data may not accurately represent production conditions, even if the test data otherwise matches the type and volume of data the application may encounter in production.

BRIEF SUMMARY

Aspects of the disclosure are directed to pre-seeding test databases in a computing environment for software testing. A system manages a pool of pre-seeded databases to serve user devices with different database requirements for their integration testing needs. Pre-seeded databases can be served more efficiently over empty databases that are populated client-side. From a user perspective, databases appear ready instantly for use as part of testing software, using the pre-seeded databases as a stand-in for production data. The system can scale a database cache of pre-seeded databases in response to increased or decreased demand. Pre-seeding databases circumvents the issues of wasted time and potential error that are otherwise possible when databases are served and populated client-side. Pre-seeding data mitigates the need to seed the database during test-time, freeing up time for more iterations and overall reducing integration test cycle durations.

Aspects of the disclosure provide for real-time restoration of databases by fixing portions of the database in-place in a cache instead of outright deletion and recreation. The process of fixing portions of the database to make them temporarily immutable before copying other portions of the database from a source database is referred to as an "in-place copy." Regenerating databases using an in-place copy as described herein also reduces the overhead otherwise incurred by generating new databases from scratch.

An aspect of the disclosure provides for a method for populating test data in a test environment, the method including: receiving, by one or more processors, a request from a device for a database including one or more rows of data, the request further including one or more parameters defining the database or data in the database; determining, by the one or more processors and from a pool of one or more pre-seeded databases, that a pre-seeded database matches the one or more parameters within a predetermined tolerance, the pre-seeded database including one or more rows of data; in response to the determination that the pool includes the pre-seeded database matching the one or more parameters within the predetermined tolerance, assigning, by the one or more processors, the pre-seeded database to the device from which the request was received; and providing, by the one or more processors, the data from the pre-seeded database in response to the request.

Other aspects of the disclosure include corresponding computer systems, apparatus, and computer programs recorded on one or more non-transitory computer-readable storage media storing instructions operable by one or more processors, each configured to perform the actions of the method.

The foregoing and other aspects of the disclosure can each optionally include one or more of the following features, alone or in combination. An aspect includes all the following features in combination.

The method further includes determining, by the one or more processors, that the pool does not include the pre-seeded database, and in response, adding a database matching the one or more parameters within the predetermined tolerance to the pool.

The request is received from the test environment performing an integration test of software using the pre-seeded database.

The method further includes restoring, by the one or more processors, the pre-seeded database, the pre-seeded database modified at one or more rows of one or more tables, wherein restoring the pre-seeded database includes restoring, using a source copy of the pre-seeded database, only the one or more modified rows.

The method further includes receiving, by the one or more processors, the request as part of a test environment start-up procedure.

The method further includes receiving, by the one or more processors, a request for restoration of the pre-seeded database to a previous time, wherein the pre-seeded database has been modified since the previous time; receiving, by the one or more processors, a changelog of modifications to the pre-seeded database; identifying, by the one or more processors and from the changelog, one or more operators applied to the pre-seeded database since the previous time; transforming, by the one or more processors and from the one or more operators, insert operators to delete operators, and delete or modify operators to copy operators; and applying, by the one or more processors, the transformed operators to the pre-seeded database.

Receiving the changelog further includes determining that the changelog is available, and wherein the method further includes in response to the determination that the changelog is not available, deleting, by the one or more processors, the pre-seeded database and re-creating the pre-seeded database from a saved source copy of the pre-seeded database.

Applying the one or more transformed operators includes: applying, by the one or more processors, the transformed operators in parallel as groups based on common primary keys representing tables in the pre-seeded database targeted by the one or more transformed operators.

Applying the one or more transformed operators includes: generating, by the one or more processors, a directed acyclic graph of the tables corresponding to the common primary keys, wherein nodes of the directed acyclic graph represent the tables and edges of the directed acyclic graph represent dependencies between tables; topological sorting, by the one or more processors, the directed acyclic graph; applying, by the one or more processors, copy operators in the one or more transformed operators to the pre-seeded database; and applying, by the one or more processors, the delete operators in the order of the topological sorted directed acyclic graph.

DETAILED DESCRIPTION

Overview

Aspects of the disclosure provide for a system managing and generating pre-seeded databases for software testing. A system manages a pool of pre-seeded databases to serve user devices with different databases for their integration testing needs. Pre-seeded databases can be served more efficiently over empty databases that are populated client-side. From a user perspective, databases appear ready instantly for use as part of testing software using the pre-seeded databases, as a stand-in for production data.

A system as described herein can scale a database cache of pre-seeded databases in response to increased or decreased demand. Multiple user devices can be served, each device having different parameters for the composition of test databases needed for performing an integration test for some software. The system manages a pool of databases. Databases can be pre-seeded to make available different desired compositions of databases used for testing. For example, a database in the pool can be pre-seeded with data formatted in a particular manner, e.g., a format used by an enterprise for storing employee records, columns of medical health data, etc. A database can be pre-seeded according to a particular table composition, e.g., to include multiple tables with different primary/foreign-key relations.

A system as described herein can pre-seed and cache databases using a pool manager and throttler. The system may pre-seed data from provided database definitions provided by user devices in communication with the system. Database definitions can specify a source database path for a source database from which to copy or seed data from. Database definition may also specify desired parameters of the pre-seeded databases, e.g., the type, format, or quantity of data stored.

The system can be configured to search for pre-seeded databases in the pre-seeded databases pool that match the parameters within a predetermined tolerance. For example, the predetermined tolerance may be set to zero, in which case a pre-seeded database is only returned if the pre-seeded database exactly matches the desired parameters. In another example, the predetermined tolerance may be non-zero, allowing for pre-seeded databases to be returned that are within a range of the desired parameters. An example of falling within a range of the desired parameters can be if a returned pre-seeded database has 500 gigabytes of data, when the parameter specifying database size was 550 gigabytes of data.

The system can be implemented in a one-time setup, reducing computational costs, e.g., measured in computing cycles or bandwidth. In some examples, the system can implement a front-end with various elements such as dashboards or alerts for monitoring the performance of the system in real time. The system can be implemented to not rely on external dependencies, which may further improve performance by reducing latency in communicating with components external to the system.

Pre-seeding data mitigates the need to seed the database during test-time, freeing up time for more test iterations and overall reducing the integration test cycle duration for software being tested. User error in correctly seeding a database to reflect desired characteristics of production data is also reduced when databases are provided pre-seeded.

The issues of seeding databases on the client-side are compounded as the demand for larger datasets increases. Large databases can be, for example, hundreds of gigabytes and terabytes large, for example. Reducing test time duration by pre-seeding databases can increase the rate at which software is released or updated, which can affect the productivity and efficiency of any system relying at least in part on the developed software to perform its functions.

The system can be at least partially implemented as a stateless database caching service. User devices may specify a target database for use from the pool of available pre-seeded databases. The system may abstract the database operations, e.g., creating and reusing a database, necessary to prepare the requested database for use by the user device.

In some examples, user devices may specify additional parameters, such as a schema, and a sequence of database operations to perform, e.g., to create, reuse, or delete data in the target database. The system can apply any schema changes, if applicable, and based on the operation, make downstream calls to services of the system configured for performing those operations. For example, for performing a database clean-up, a clean-up service can be invoked by the system. The clean-up service can receive a description of data to delete or clean-up according to a data manipulation language, partition the data, and perform a clean-up of each partition concurrently. In these examples, the system can provide for different dashboards and alerts available, for example, for monitoring the status of operations specified by the user to perform.

Integration tests or user acceptance tests (UAT) are sometimes executed for an extended period, e.g., days, weeks, or even months. During a test execution, the tested application may be updated, e.g., to fix bugs discovered during testing or to add or enhance a feature of the application. These updates often result in the modification of data stored in the test environment, which, to preserve the consistency of later testing, must be later restored or backed up to an earlier point before the modification.

Traditionally, back-up or restore mechanisms for a database are infrequently called, usually reserved for situations such as disaster recovery following a catastrophic data loss. These mechanisms are not tuned for frequent use or partial recovery of a database but are instead intended for deleting and restoring new databases infrequently. This approach can result in significant down-time for testing as time must be allowed for a database system to effectively delete or drop the modified database and copy a back-up or source database from a back-up disc. As a result, integration tests may time out or fail waiting for a database to be restored to a point needed for consistent testing of a target application.

Aspects of the disclosure provide for real-time restoration of databases by fixing portions of the database in-place in a cache, instead of outright deletion and recreation. Fixing data in this context can refer to rendering the data temporarily immutable, such that a back-up or restore service performed on the database skips over the fixed data. A system configured according to aspects of the disclosure can receive a changelog of modifications to rows of data in a database and identify from the changelog only those rows of data changed during an integration test or UAT. The system fixes the records not modified, and when performing the back-up or restore process, omits those records from being redundantly deleted and copied from a back-up disc. The process of fixing data and restoring only modified data is referred to as an in-place copy.

Instead of reversing or rolling back all the operators performed from the latest to the oldest modification to the database, a changelog or other journal or recorded database modifications is processed to transform relevant operators. Relevant operators are identified as modifying records of a database after a desired restore point, and the transformation can include transforming INSERT operators to DELETE operators; and transforming DELETE or MODIFY operators to COPY operators.

When the number of write operations performed are small, e.g., hundreds or thousands of operations, the databases can be restored in a brief time, e.g., seconds or minutes. Even as the size of databases vary from test-to-test, because test-time operations may target a small subset of rows, the overall time to restore a database according to aspects of the disclosure may not scale with database size. Because the complete database is not restored, restoration is cheaper, at least because less memory and compute resources are used.

Databases may be returned to the pool after use, sometimes in a corrupted state. Rather than deleting the databases, the system processes and deletes individual database rows as described herein. Deleting the individual rows rather than the entire database can be more memory efficient, as space from a deleted database may not be freed up until a garbage collection service is performed. Individual row deletion prepares the database for reuse. Later, the system may receive a subsequent request for the database and may serve the database in lieu of serving an empty database for the requesting device to seed separately and prior to performing an integration test.

Regenerating databases using an in-place copy as described herein also reduces the overhead otherwise incurred by generating new databases. A new database often is connected to various other modules or services, which must be restarted as part of creating a new database. Regenerating a database with in-place copying as described herein eliminates the need to restart any services attached to the database. As test environments are often deployed for an extended period, e.g., days, weeks, or months, the environments can continue to operate with potentially reduced downtime, at least because the connections to existing services remain uninterrupted.

Example Systems

Figure 1:
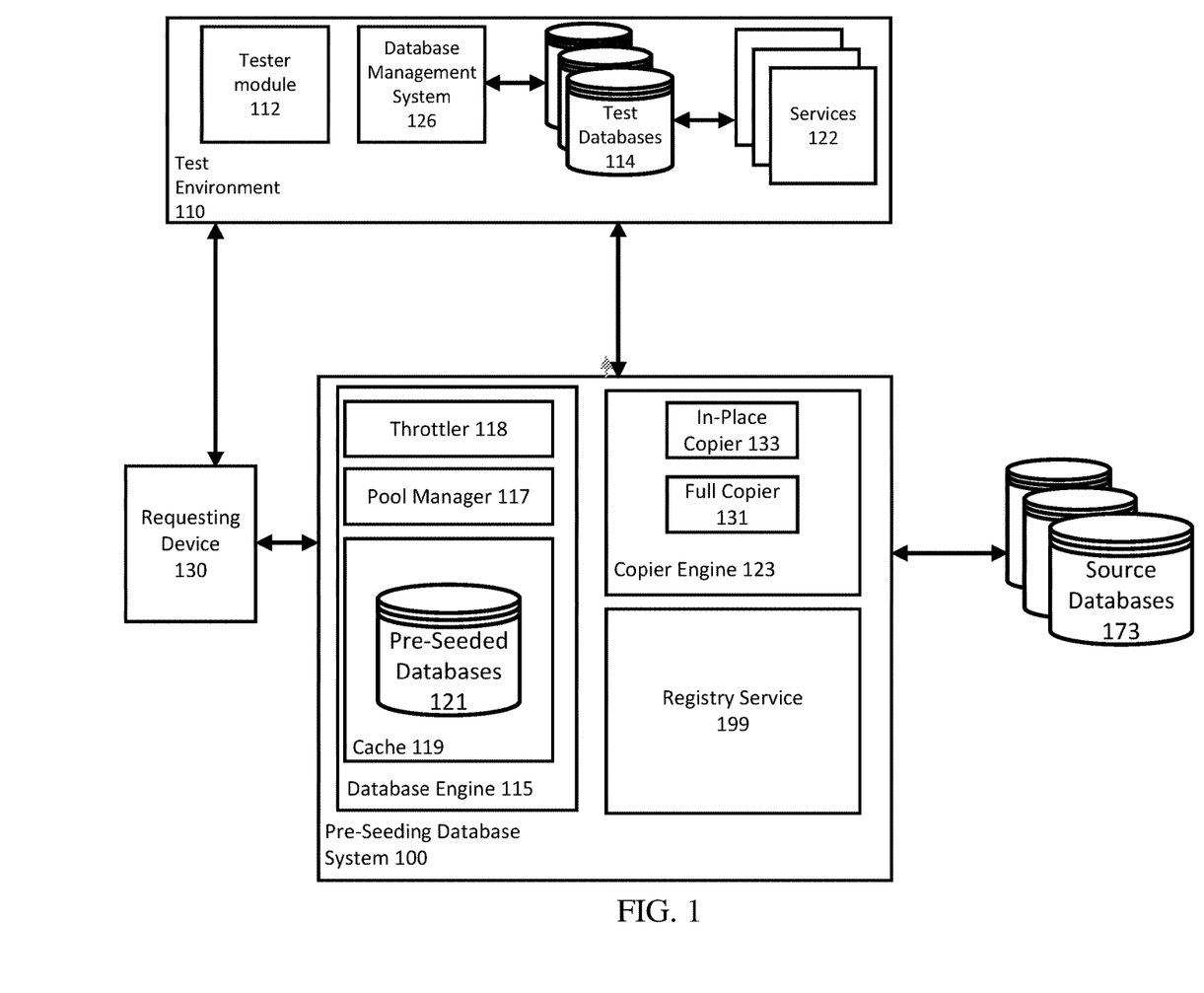
FIG. 1 is a block diagram of a pre-seeding database system providing pre-seeded databases for a test environment, according to aspects of the disclosure.

FIG. 1 is a block diagram of a pre-seeding database system 100 providing pre-seeded databases for a test environment 110, according to aspects of the disclosure. As described herein with reference to FIG. 6, the test environment 110 can include one or more servers or other computing devices which may be located at one or more locations. In addition, or alternatively, the system 100 can also provide pre-seeded databases for a staging environment, in addition to or as an alternative to a test environment.

Test and staging environments are generally not accessible to users and are private to the developers of an application being tested. By contrast, a production environment is an environment in which services 122 are live and may be potentially actively accessed by a user device. The environment 110 can host a variety of services 122, for example microservices of an application hosted on a computing platform. The services 122 can be interrelated according to a variety of different technologies, such as through remote procedure calls (RPCs) and/or an Application Programming Interface (API) implemented in accordance with a REST (Representational State Transfer) architectural style. Other example techniques for interconnecting the services 122 are also possible.

Test data stored at test databases 114 may be used to support operations of the services 122, or other types of applications. In this specification, a datastore can be any source of persistent storage, such as any type of non-transitory computer readable medium capable of storing information, such as a hard-drive, solid state drive (including non-volatile memory express (NVMe) drives), tape drive, optical storage, memory card, ROM, RAM, DVD, CD-ROM, SD card, write-capable, and read-only memories. A database can be a relational database, for example managed by a database management system (DBMS) 126 or similar. A database can store one or more tables, each table having several columns and records or rows.

The requesting device 130 can be, for example, a user computing device configured to communicate with the system 100 over a network. As described in FIG. 6, a requesting device can be connected to the system 100 over a network according to a variety of different technologies. Although one requesting device 130 is shown, the system 100 and/or the test environment 110 can interact with multiple devices, sequentially and/or concurrently.

The DBMS 126 can be configured to receive database requests, for example as RPC calls, to read or write data from or to the test databases 114. If a staging environment is implemented, in some examples the structure and number of test databases 114 can mirror the databases in the production environment.

The test databases 124 may include multiple tables, whereby at least some of the stored tables include data accessed by or entered from the related applications or services. The tables may be related to one another according to a predefined database schema. For example, one table may be linked to another table according to one or more foreign keys, defining foreign-key relationships, according to a database schema. As another example, specific rows of one or more tables may be interleaved within the specific rows of another table. These relationships may be used to define data integrity within the database, such that an inaccurate data entry may be detected and avoided or corrected within the database quickly.

As described herein, the requesting device 130 makes a request for a pre-seeded database, which is later provided to the test environment 110. The test environment 110 can include a tester module 112 configured to conduct tests for the services 122 using test data populated in the test databases by the system 100. The tests can be any of a variety of tests that can be performed for conducting integration testing for new services or new or updated features for services currently in the production environment. In some examples, the tester module 112 is configured to test database contents to ensure data integrity.

The system can include a database engine 115, a copier engine 123, and a registry service 199. The database engine 115 can include a pool manager 117, a throttler 118, and a cache 119. The cache 119 can store pre-seeded databases 121. The database engine 115 can handle database operations as a stateless service. The engine 115 can receive requests from the requesting device 130 for providing a pre-seeded database for populating the test database of a test environment. The engine 115 can also provide a number of other services for managing the cache 119 and the pre-seeded databases 121, described presently.

The engine 115 can receive a database definition for specifying the creation, deletion, retrieval, or reuse of a pre-seeded database. The database definition can include a number of parameters related to the desired pre-seeded database. As described herein with reference to FIGS. 2A and 2B, the database definition may include additional parameters. The additional parameters can include requests to monitor or track the status of a pre-seeded database, e.g., total runtime, number of queries made to the database, etc. Data collected from the status tracking can be used to populate dashboards or generate alerts that can be accessed from the requesting device 130.

An example database definition that can be received can include a database path targeting the database in the cache 119 for which operations should be performed. Another example parameter in the database definition can be a database schema for specifying how a database should be created or modified. Another example parameter in the database definition can include a database path to a source database, e.g., source databases 173. Another parameter can include the type of operation to perform, e.g., to create a pre-seeded database, to edit a pre-seeded database, or to remove a pre-seeded database. Other example parameters can include the quantity of data desired in the received pre-seeded database. In different examples, more or fewer parameters that what has been described here may be in a request with a database definition for creating, retrieving, deleting, or modifying a pre-seeded database in the cache 119.

The pool manager 117 can provide a mapping and locking mechanism for databases stored in the cache 119. The cache 119 can store multiple databases under a single datastore, or multiple datastores. The cache 119 can include one or more datastores, each corresponding to a respective repository from which databases are cached and retrieved. Databases in a datastore can be named according to a consistent database naming convention enforced by the pool manager 117. The pool manager 117 identifies unassigned databases or generates databases when the cache 119 has additional space available for new databases to serve incoming requests.

Throttler 118 can be configured to throttle incoming requests to retrieve or operate on pre-seeded databases 121 in the cache 119. For example, the throttler 118 may determine whether requests are being responded to within a predetermined response period. If requests are not being responded to in time, then the throttler 118 can take action in response. For example, the throttler 118 can queue incoming requests until existing requests are responded to within the predetermined response period. In addition, or alternatively, the throttler 118 can reject incoming requests until the system catches up with the existing requests.

The cache 119 can be in one of three states. The cache 119 may be full, in which case each of the pre-seeded databases 121 are actively being used. In this state, the throttler 118 may throttle incoming requests. In a second state, the cache 119 may be full but not all the pre-seeded databases 121 are in use. In a third state, the cache 119 may be not full.

The pool manager 117 can scale the number of pre-seeded datastores 121 in the cache 119 depending on a variety of factors, e.g., available cache space, demand for different pre-seeded datastores, the volume of requests, etc. At least part of the determination for scaling the pre-seeded datastores 121 can be based on data from the registry service 199. The registry service 199 can keep track of database operations performed and manage metrics and records. The registry service 199 can be used for populating dashboards and/or alerts on a user interface accessible by the requesting device 130. The registry service 199 can receive data describing various operations performed by the system 100 as event logs. The registry can then, as examples, log data from the event logs into a separate repository and/or update daily aggregations of different types of recorded metrics or analytics.

To scale the databases, the pool manager can maintain a buffer of pre-seeded databases. The pool manager 117 can periodically or continuously check that the buffer has at least a predetermined minimum number of pre-seeded databases that can be used to populate the cache 113. The pool manager 117 can run scheduled jobs for occasionally requesting database definitions from the requesting device 130 and/or other devices in communication with the system 100. The system can use the database definitions to create new pre-seeded databases as described herein but store the generated databases to the buffer instead of the cache 119. In this way, the buffer is always ready to populate the cache 119 with additional databases.

The pool manager 117 can identify existing databases in the cache 119 that satisfy a received request by comparing parameters in a received database definition with parameters of cached pre-seeded databases. As described herein with reference to FIG. 2B, the search and comparison of cached pre-seeded databases to a database specified in a received database definition can be within a predetermined tolerance. The predetermined tolerance can impose an exact match or allow for some differences between the assigned pre-seeded database and the database specified in the database definition.

The copier engine 123 can implement the in-place copier 133 and a full copier 131 for restoring a test database depending on the availability of a changelog. The in-place copier 133 is configured to restore databases modified during a test by rolling back only those rows that were modified during the test. If a changelog is available, the copier engine 123 can use the in-place copier 133, which can be configured to perform example processes 300, 400 described herein for real-time restoration of a database and illustrated in FIGS. 3-4. The pool manager 117 can invoke the copier engine 123 to copy data from source databases 173. The full copier 123 can copy entire source databases to generate new pre-seeded databases. The in-place copier 133 can regenerate or modify existing databases in the cache 119 using the source databases 173.

The in-place copier 133 can fix databases in-place in the cache 119, as opposed to dropping or deleting the databases. The in-place copier 133, as described herein with reference to FIGS. 3 and 4, can use a database changelog and a specified timestamp to roll back only changes to modified rows in a database. The in-place copier 133 can fetch unique primary keys of the modified rows and selectively copy updated or deleted rows and delete the newly inserted rows. This form of selective copying handles correctness as well by ordering copy instructions in a reverse hierarchical order using a topological sorted graph generated by the system 100.

Example Methods

Figure 2A:
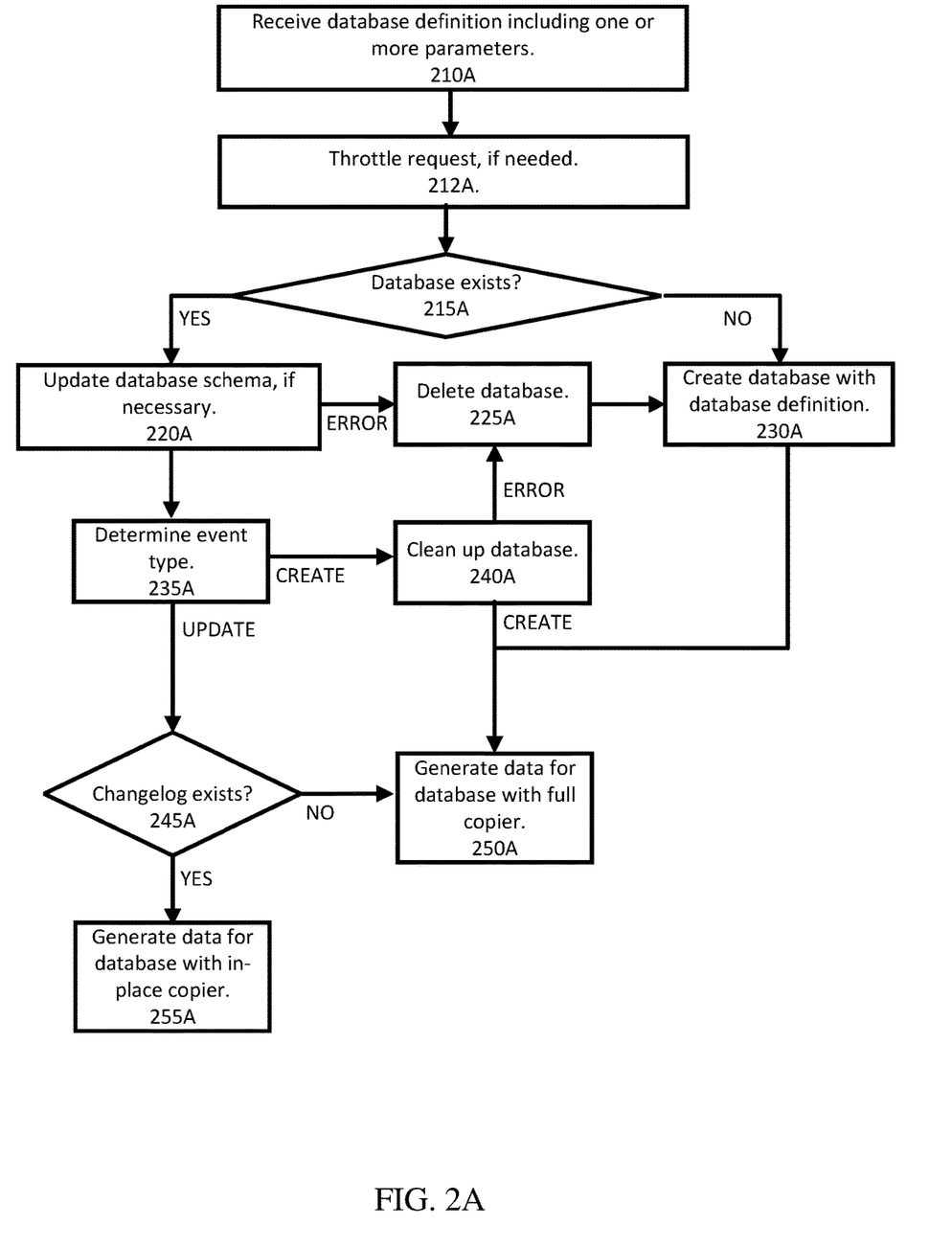
FIG. 2A is a flow diagram of an example process for resolving requests for operating on pre-seeded databases by the example pre-seeding database system.

FIG. 2A is a flow diagram of an example process 200A for resolving requests for operating on pre-seeded databases by the example pre-seeding database system 100. The example process 200A is a high-level process that can include several other processes, e.g., processes 200B, 300, and 400. A system including one or more processors, for example the system 100 of FIG. 1, can be configured to perform the processes 200A, 200B, 300, and/or 400. Although the processes 200A, 200B, 300, and 400 are shown and described as a sequence of steps, it is understood that in other examples, steps of the processes 200A, 200B, 300, and 400 may be added, deleted, and modified, and/or performed sequentially and/or in parallel.

The system receives a database definition including one or more parameters, according to block 210A. The database definition can be received as part of a request from a requesting device, e.g., the requesting device 130 of FIG. 1. The database definition can also include parameters specifying a database schema and the type of operation to perform on the database.

The system can throttle the request, if needed, according to block 212A. As described herein with reference to FIG. 1, a throttler 118 in the system 100 can determine whether the request should be throttled, e.g., based on the current volume and rate of requests for pre-seeded databases. If the system throttles the request, the system may delay or cancel the request. Otherwise, the system processes the request, e.g., proceeds with the step according to block 215A.

Figure 2B:
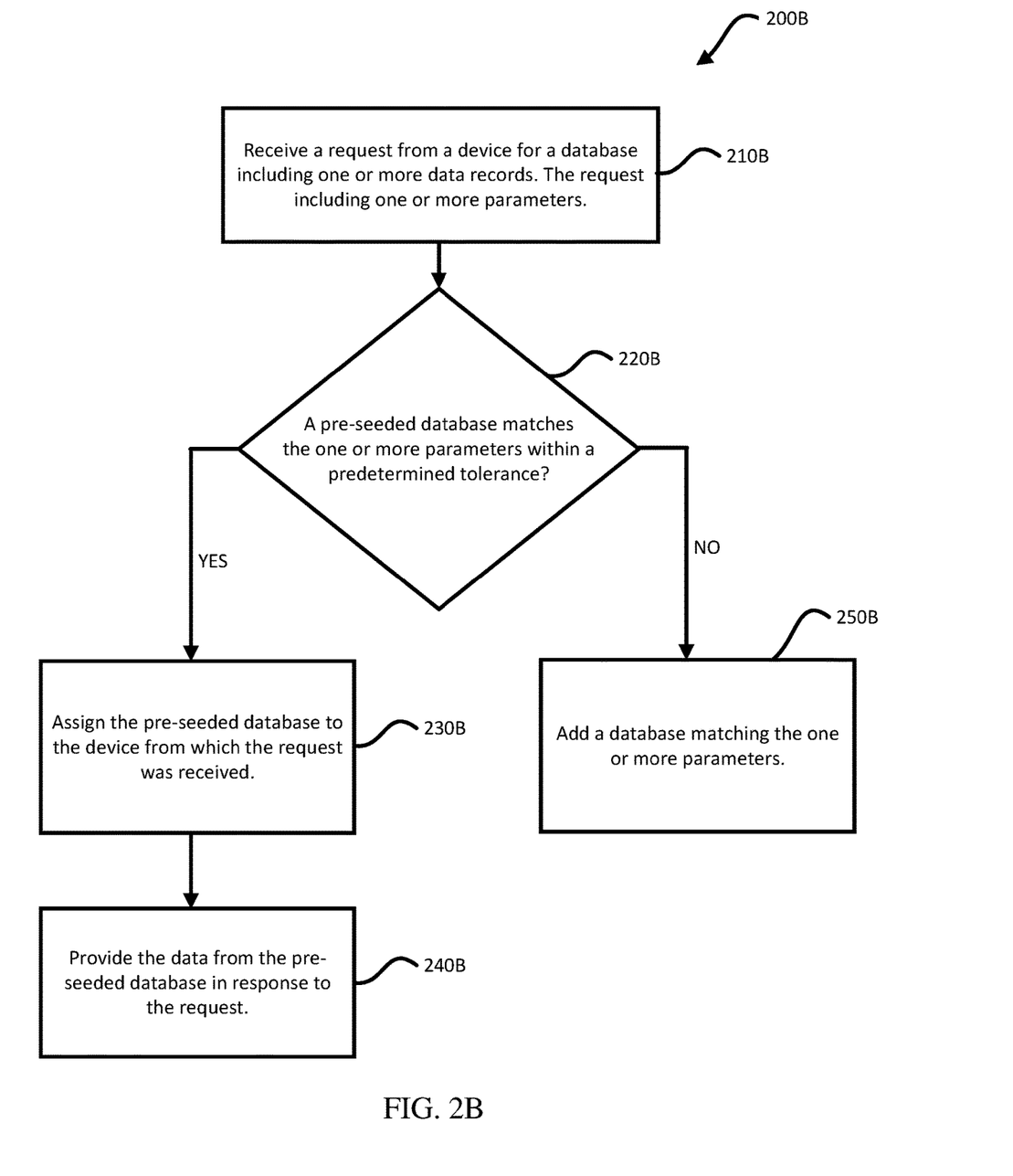
FIG. 2B is a flow diagram of an example process for serving requests for pre-seeded databases, according to aspects of the disclosure.

The system determines whether the database exists, according to decision block 215A. The steps in blocks 210A and 215A can be performed by executing process 200B. For example, determining whether the database exists as in block 215A can be based on comparing the parameters received in the database definition against parameters of existing pre-seeded databases. The comparison can be within a predetermined tolerance, as described herein.

If the database specified in the database definition exists ("YES"), then the system updates the database schema, according to block 220A. If there is an error in updating the schema ("ERROR"), then the database is deleted according to block 225A.

If the database is deleted according to block 225A, then the database is created using the database definition, according to block 230A. The database is created and stored in the cache of the system, e.g., the cache 119. If the database does not exist according to block 215A ("NO"), then the system creates the database according to block 230A.

If there is no error after updating the database schema, then the system determines the event type, according to block 235A. FIG. 200A describes two event types, UPDATE and CREATE. In some examples, a request to DELETE a database can be received, in which case the system deletes the targeted pre-seeded database.

If the specified event is to create a database ("CREATE"), then the system cleans up the database, if a database is already present, according to block 240A. The step at block 240A is skipped, if a database is not present. Cleaning-up the database performs a process of safely removing the database from the cache, such that a new database can be successfully created. If an error occurs ("ERROR") from cleaning up the database according to block 240A, then the database is deleted and recreated, according to blocks 225A and 230A. Branch handling at the step in block 240A is an important step when the system allows external systems, such as a system including the requesting device, to directly access the system. The step in block 240A ensures that any external system can request CREATE operation without worrying about the context of whether the request should actually be an UPDATE operation, because a database already exists.

If the specified event is to update a database ("UPDATE"), then the system determines whether a changelog exists for the database, according to decision block 245A. If a changelog exists ("YES"), the system generates data for the database using the in-place copier, according to block 255A. Updating the database using an in-place copier is described in more detail with reference to FIGS. 3 and 4. The source of the data used to update the database can be specified in the database definition as a source path to a source database, e.g., a source database from source databases 173.

If the system determines that the changelog does not exist ("NO"), then the system generates data for the database with a full copier, according to block 250A. The full copier copies a source database entirely, instead of targeting a subset of rows as in the in-place copier. The full copier is used also when the event type is set to create ("CREATE"), e.g., following the steps in blocks 230A and 240A. The source database from which data is copied is specified as a parameter in the database definition received as part of the request.

FIG. 2B is a flow diagram of an example process 200B for serving requests for pre-seeded databases, according to aspects of the disclosure.

The system receives a request from a device for a database including one or more rows of data, according to block 210B. The request can include one or more parameters defining the database or data in the database. Example parameters can include the type, format, or quantity of data stored. The type and format of the data can be represented at least partially by a database schema, which can also specify the organization and structure of the requested database. The parameters can also include the source path of the source database from which the pre-seeded database is to be created. Other example parameters can include a tolerance value, for determining the tolerance in comparing the parameters of the requested database, to pre-seeded databases in the cache. The example parameters can also include a timestamp or other data indicating from what point in time the database should be restored, e.g., as part of an in-place or full copy.

The requesting device may manage or be connected to a test environment performing an integration of software using the requested pre-seeded database. In some examples, the request can be received as part of a test environment start-up procedure. A start-up procedure can be a sequence of steps performed by one or more processors for preparing a test environment to execute a software test. The test environment, for example as described herein with reference to FIG. 1, can include a repository of different databases provided from a pre-seeded database pool for use during a software test.

The system can receive a data database definition specifying the composition of different pre-seeded databases in the cache. For example, the database definition can include a network path for a source database to be used in pre-seeding databases in the cache. The database definition can also include a database schema defining the composition of a pre-seeded database.

The system determines, from a pool of one or more pre-seeded databases, that a pre-seeded database matches the one or more parameters within a predetermined tolerance, according to decision block 220B. A pre-seeded database can include one or more rows of data. As described herein with reference to FIG. 1, the pre-seeded databases can be managed as a pool of databases in a cache. As described herein, the predetermined tolerance may be set to zero, in which case a pre-seeded database is only returned if it exactly matches the desired parameters. The predetermined tolerance may be non-zero, allowing for pre-seeded databases to be returned that are within a range of the desired parameters.

In response to the determination that the pool includes the pre-seeded database matching the one or more parameters within the predetermined tolerance ("YES"), the system assigns the pre-seeded database to the device from which the request was received, according to block 230B.

The system provides the data from the pre-seeded database in response to the request, according to block 240B. As described herein with reference to FIG. 1, assigning the pre-seeded database to the requesting device occupies the database in the cache, temporarily preventing the pre-seeded database from use by other devices until the database is released.

In response to the determination that the pool does not include the pre-seeded database matching the one or more parameters within the predetermined tolerance ("NO"), the system adds a database matching the one or more parameters within the predetermined tolerance to the pool, according to block 250B. In some examples, instead of adding another database to the pool, the system may reject the request and indicate that a database matching the parameters is not available. In some examples adding additional databases to the pool may be based on demand, e.g., if the database is requested a number of times in excess of a threshold, the system may remove a lesser-requested database from the pool in favor of a more popular database.

Figure 3:
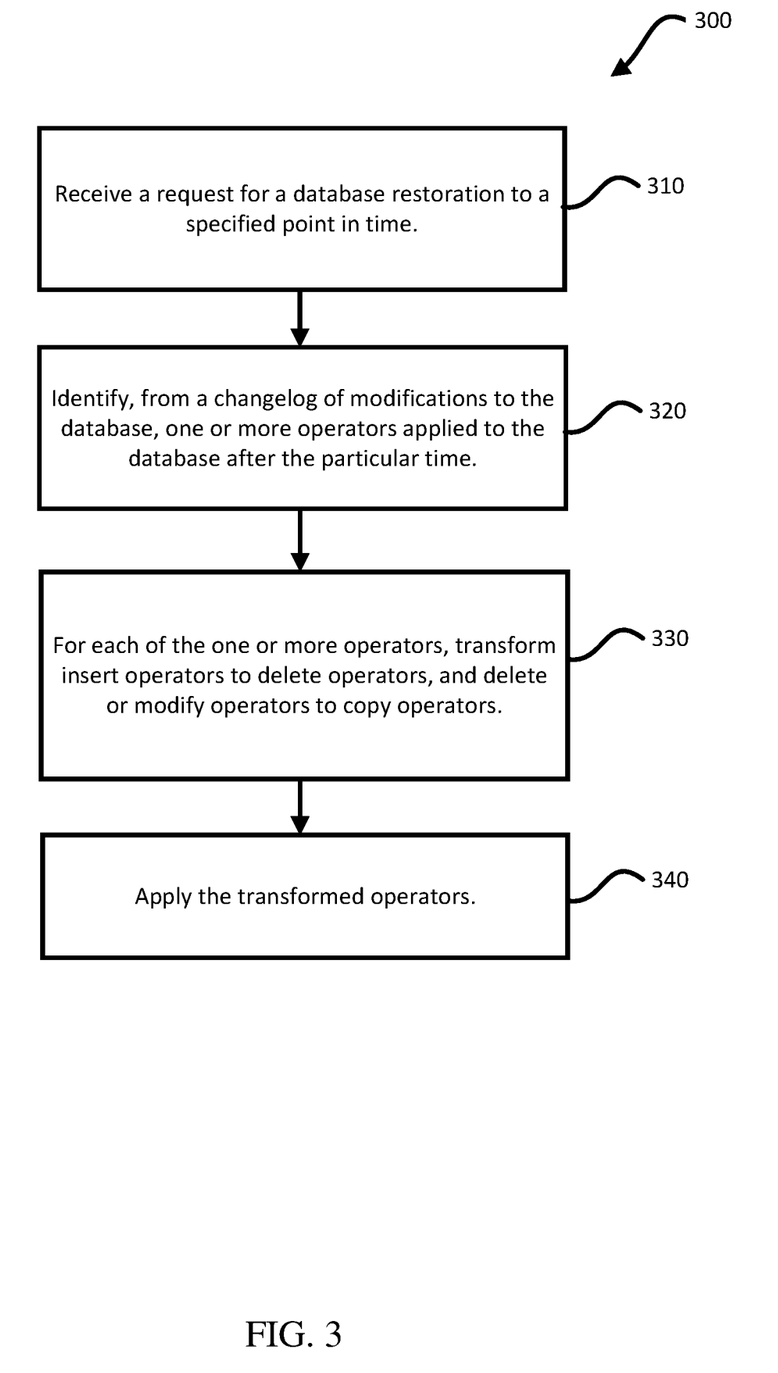
FIG. 3 is a flow diagram of an example process for real-time restoration of a database, according to aspects of the disclosure.

FIG. 3 is a flow diagram of an example process 300 for real-time restoration of a database, according to aspects of the disclosure. As described herein, a system can fix errors a database causes by writes performed during a test. Before the database can be assigned to another device for another test, the contents of the database should be restored back to its original condition before the test was performed. Restoring the database can ensure the consistency of tests performed, at least because each test begins with the same initial data.

A system receives a request for a database restoration to a specified point in time, according to block 310. The request can include a timestamp or other indicator for the time up to which the database restoration is to be performed. For example, a timestamp may be received for a time immediately before the execution of a feature of an application being tested that caused data in a test database to be modified during testing. The request may be issued automatically upon a database being un-assigned from a device.

The system receives a changelog of modifications to the pre-seeded database, according to block 320. A changelog can refer to any collection of data, logs, files, data structure, etc., tracking modifications to the database. The changelog can include specific operations performed by a DBMS in modifying the database, including, for example INSERT, COPY, DELETE, MODIFY operations, etc. The changelog can also include the primary keys or other identifier for tables modified in the database.

In some examples, the system can determine whether a changelog is available. If a changelog is not available, the system can delete the pre-seeded database and re-create the database from a save source copy of the pre-seeded database. In these examples, a "full copy" is performed instead of an "in-place copy," to ensure that the resulting database is accurate when it is made available for assignment again in the pool. The availability of a changelog as described herein allows for a precise modification of only database rows changed after the specified time.

The system identifies, from the changelog of modifications to the database, one or more operators applied to the database after the specified point in time, according to block 330.

According to block 340, for each of the one or more operators, the system transforms insert operators to delete operators, and delete or modify operators to copy operators. For example, instances of INSERT operators are transformed into DELETE operators, while instances of DELETE or MODIFY operators are transformed into COPY operators, for copying the deleted or modified rows from a source database.

The system applies the transformed operators to the database, according to block 350. The transformations reverse the operators, however, to preserve the correctness of the original database, the system can first apply the copy operators, before applying the delete operators. Copying before deleting will recreate deleted rows, fixed data in individual fields of the modified data, and ensure foreign-key dependencies are not broken by applying the transformed operators.

The following is an example of why applying transformed copy operators before transformed delete operators can preserve the correctness of the database during a restoration. Suppose that, before a modification, row 1B of table B pointed to row 1A of table A. After the modification, row 1A was deleted, row 2A was inserted, and row 1B of table B now points to row 2A. In restoring the database to its original state, if row 2A is deleted first, or if row 1B is updated first to point to row 1A, the restoration fails. In the first case, deleting row 2A would remove a dependency row 1B originally had. In the second case, row 1B cannot point to row 1A because row 1A was deleted. Therefore, the correct order of operations is to insert row 1A, update the dependency of row 1B to row 1A, and then delete row 2A.

In some examples, the system can perform additional operations for facilitating parallel application of several of the transformed operators at once. For example, the system can identify common identifiers or primary keys for tables affected by the transformed operators, and execute groups of transformed operators in parallel, where the groups are based on a respective common table modified by operators in each group.

Figure 4:
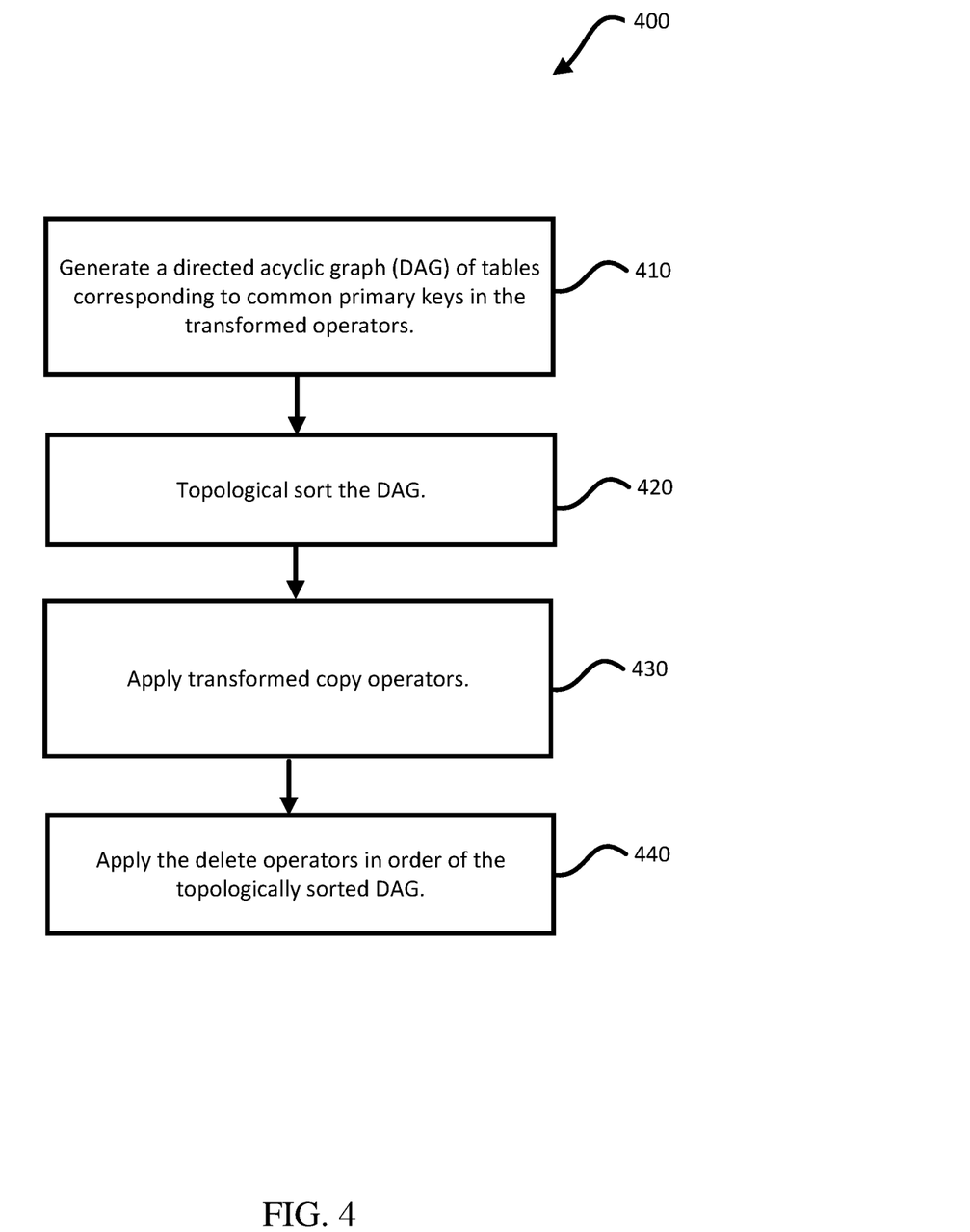
FIG. 4 is a flow diagram of an example process for parallel application of transformed operations for real-time restoration of a database.

FIG. 4 is a flow diagram of an example process for parallel application of transformed operations for real-time restoration of a database. The example process 400 can enable parallel processing of transformed operators while ensuring that delete operators are not performed before copy operators.

The system generates a directed acyclic graph of tables corresponding to common primary keys in the transformed operators, according to block 410. As the transformed operators may only affect a small subset of the database, the system can parse the transformed operators to identify the unique primary keys or identifiers for tables affected by the transformed operators. Nodes of the DAG can represent the tables, while edges of the DAG can represent dependencies between the tables.

The system topological sorts the DAG, according to block 420. A topological sort is a linear ordering of nodes in a directed graph. The ordering enforces the condition that, for each edge between a node A to a node B, node A comes before node B in the linear ordering. The identifier module 104 can implement any of a variety of different processes for topological sorting the directed graph, for example, using Kahn's algorithm or depth-first search.

The system applies copy operators in the one or more transformed operators to the pre-seeded database, according to block 430. The transformed copy operators can be obtained, for example, by performing the process 300 described herein with reference to FIG. 3.

The system applies the delete operators in the order of the topological sorted DAG, according to block 440. Operators in the same level can be performed in parallel, but operators appearing later in the order are executed before operators earlier in the order.

Figure 5A:
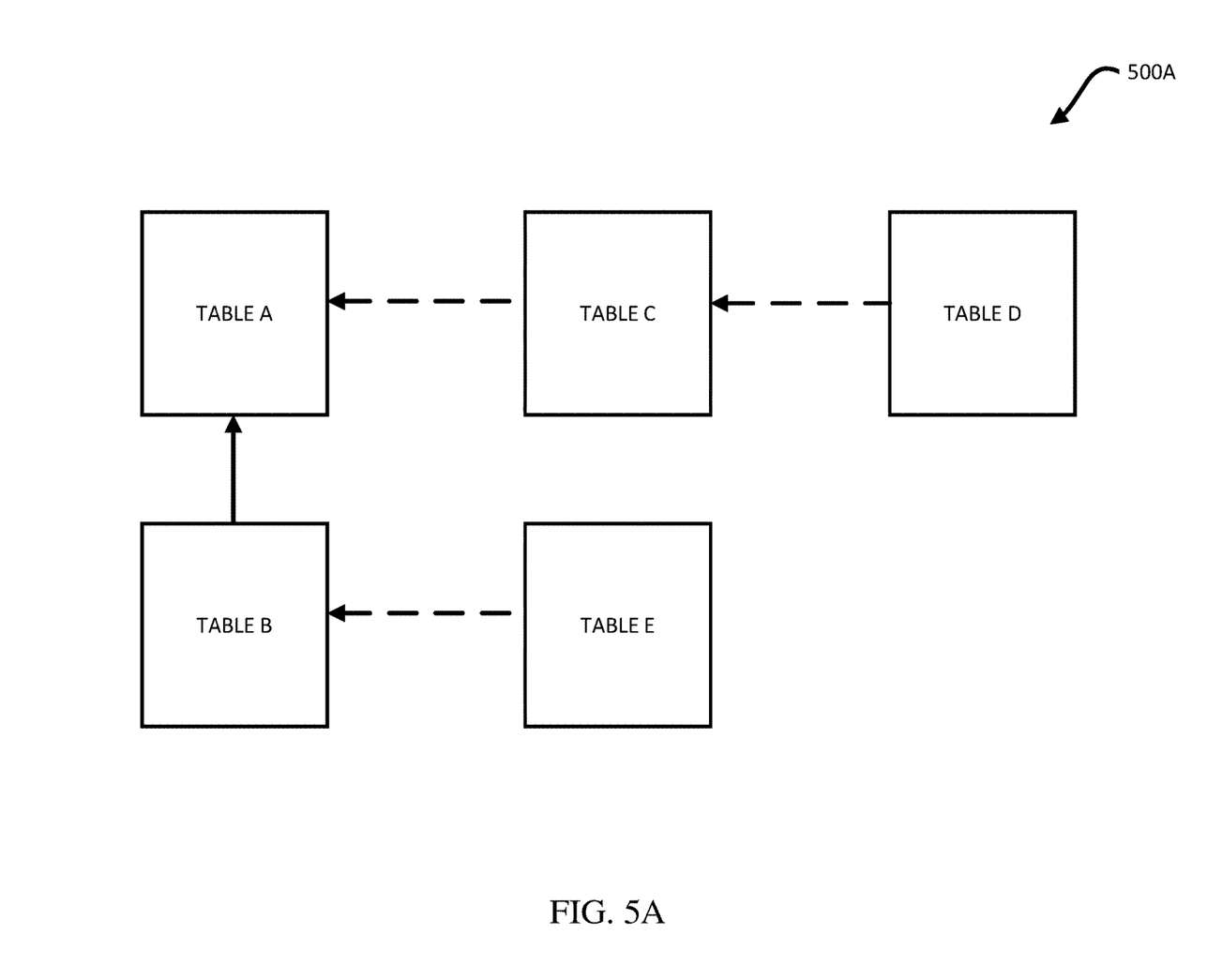
FIG. 5A is an example DAG generated by a pre-seeding database system according to aspects of the disclosure before topological sorting.

FIG. 5A is an example DAG 500A generated by a pre-seeding database system according to aspects of the disclosure before topological sorting. DAG 500A includes tables A, B, C, D, and E. The solid arrow, e.g., between table A and table B, represents a parent-child relationship, while the dashed lines, e.g., between tables B and E, C and D, and A and C, represent foreign key relationships between the respective tables.

Figure 5B:
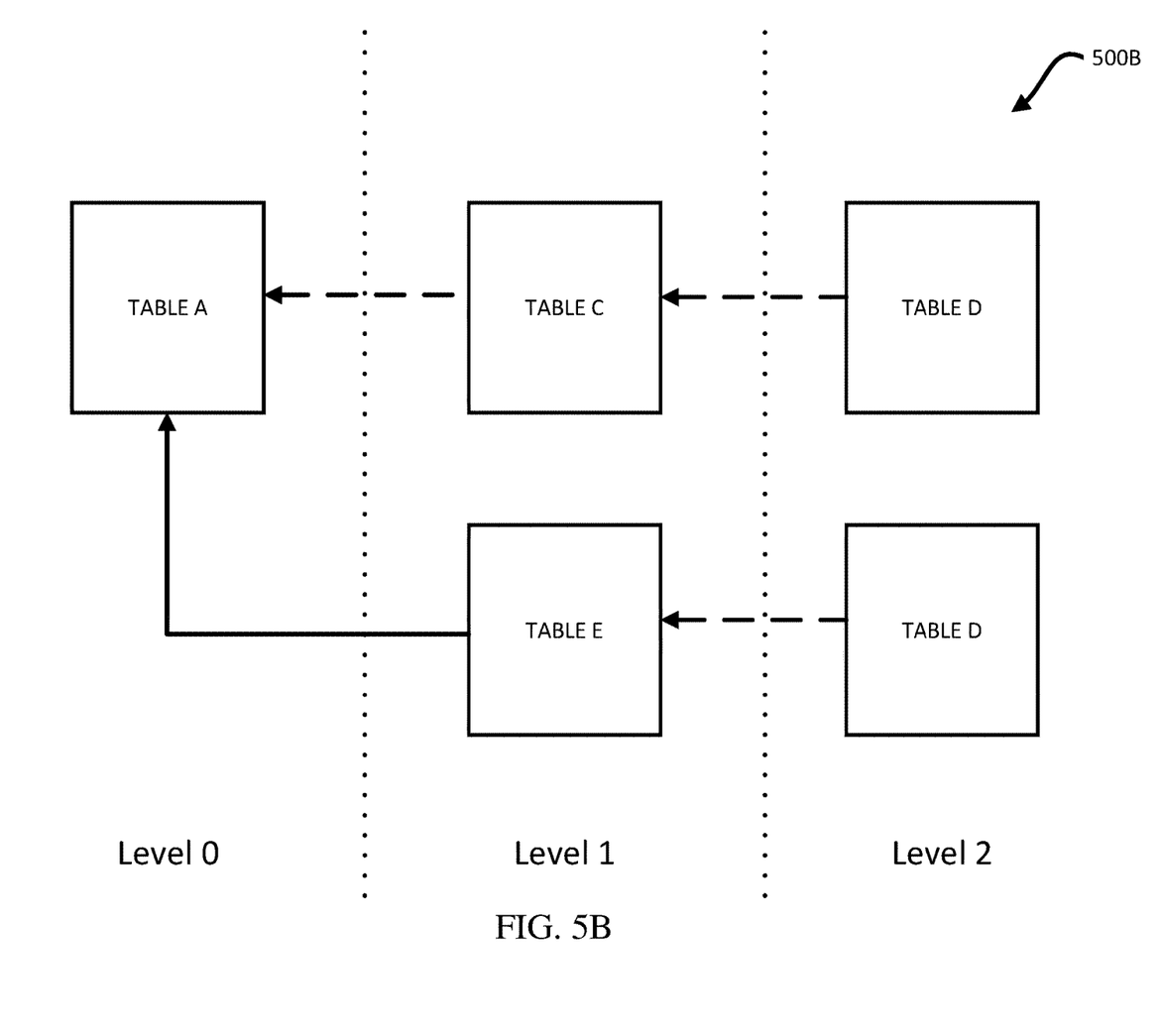
FIG. 5B is an example DAG generated by a pre-seeding database system according to aspects of the disclosure after topological sorting.

FIG. 5B is an example DAG 500B generated by a pre-seeding database system according to aspects of the disclosure after topological sorting. After topological sorting, the DAG 500B is sorted into three levels, level 0, level 1, and level 2. The system can apply the COPY operators for each level, before applying the DELETE operators for each level. For example, the system can apply COPY operators keyed to tables D and E, then B and C, and then finally to table A. Operators applied to tables in the same level can be applied in parallel. The system can then apply DELETE operators in order of the sorted DAG 500B. For example, the system can apply DELETE operators keyed to tables D and E first. Then, the system can apply DELETE operators keyed to tables B and C, in parallel. Finally, the system can apply DELETE operators keyed to table A.

The following is an example of why COPY and DELETE operators should be applied level-by-level, as described with reference to FIGS. 5A and 5B. Table A has a foreign-key relationship with table B. As an example, initially, row A1 in table A points to row B1 in table B. After a test was performed using tables A and B, row A1 started pointing to row B2. Moreover, row B1 was also deleted during the test. To restore the database including tables A and B to its state before the test was executed, the system first executes a COPY operator to restore row B1 in table B. Then, the system executes a COPY operator to restore row A1 in table A. This order avoids raising potential exceptions, such as an index violation exception that would otherwise occur if row A1 is restored to point to row B1, before row B1 is restored.

Example Computing Environment

Figure 6:
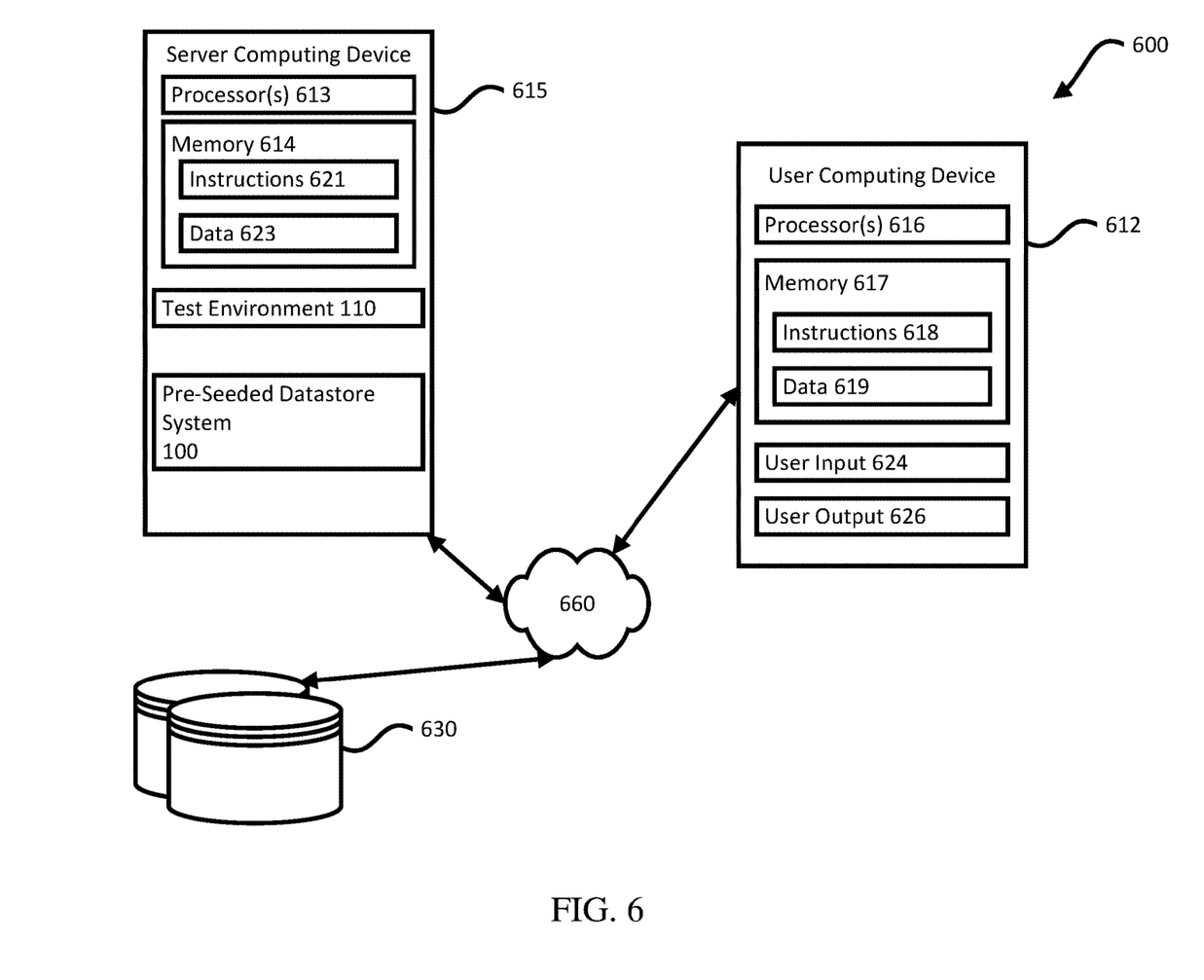
FIG. 6 is a block diagram of an example environment for implementing a pre-seeding database system.

FIG. 6 is a block diagram of an example environment 600 for implementing the pre-seeding database system 100. The system 100 can be implemented on one or more devices having one or more processors in one or more locations, such as in server computing device 615. User computing device 612 and the server computing device 615 can be communicatively coupled to one or more storage devices 630 over a network 660. The user computing device 612 can be a requesting device 130, as described herein with reference to FIG. 1.

The storage device(s) 630 can be a combination of volatile and non-volatile memory or persistent storage devices and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories. The storage device(s) 630 can include production and/or test databases 124, 114 described herein with reference to FIG. 1.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the system 100 consistent with aspects of this disclosure. The system 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured like the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors. The user computing device 612 can be a requesting device sending database requests to a database management system and/or the system 100

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

The environment 600 can include the test environment 110 and/or a production environment or a staging environment. Environments can be implemented across one or more devices, using a combination of processors, memory, and storage devices as described herein with reference to the environment 600.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHZ (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615, user computing device 612, and datacenter 660 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A method for populating test data in a test environment, the method comprising:
  receiving, by one or more processors, a request from a requesting device in the test environment for selecting a pre-seeded database for use in performing an integration test of software, the pre-seeded database comprising one or more rows of data, the request further comprising one or more parameters defining the pre-seeded database;
  determining, by the one or more processors and from a pool of one or more pre-seeded databases, that the pre-seeded database matches the one or more parameters within a predetermined tolerance;
  in response to the determination that the pool comprises the pre-seeded database matching the one or more parameters within the predetermined tolerance, assigning, by the one or more processors, the pre-seeded database to the requesting device, wherein assigning the pre-seeded database to the requesting device temporarily prevents use of the pre-seeded database by other devices until the pre-seeded database is released; and
  providing, by the one or more processors, the data from the pre-seeded database in response to the request.

2. The method of claim 1, further comprising:
  determining, by the one or more processors, that the pool does not comprise the pre-seeded database, and in response, adding a database matching the one or more parameters within the predetermined tolerance to the pool.

3. The method of claim 1,
  wherein the method further comprises restoring, by the one or more processors, the pre-seeded database, the pre-seeded database modified at one or more rows of one or more tables, wherein restoring the pre-seeded database comprises restoring, using a source copy of the pre-seeded database, only the one or more modified rows.

4. The method of claim 1, wherein the method further comprises receiving, by the one or more processors, the request as part of a test environment start-up procedure.

5. The method of claim 1, further comprising:
  receiving, by the one or more processors, a request for restoration of the pre-seeded database to a previous time, wherein the pre-seeded database has been modified since the previous time;
  receiving, by the one or more processors, a changelog of modifications to the pre-seeded database;
  identifying, by the one or more processors and from the changelog, one or more operators applied to the pre-seeded database since the previous time;
  transforming, by the one or more processors and from the one or more operators, insert operators to delete operators, and delete or modify operators to copy operators; and
  applying, by the one or more processors, the transformed operators to the pre-seeded database.

6. The method of claim 5, wherein receiving the changelog further comprises determining that the changelog is available, and wherein the method further comprises:
  in response to the determination that the changelog is not available, deleting, by the one or more processors, the pre-seeded database and re-creating the pre-seeded database from a saved source copy of the pre-seeded database.

7. The method of claim 5, wherein applying the one or more transformed operators comprises:
  applying, by the one or more processors, the transformed operators in parallel as groups based on common primary keys representing tables in the pre-seeded database targeted by the one or more transformed operators.

8. The method of claim 7, wherein applying the one or more transformed operators comprises:
  generating, by the one or more processors, a directed acyclic graph of the tables corresponding to the common primary keys, wherein nodes of the directed acyclic graph represent the tables and edges of the directed acyclic graph represent dependencies between tables;
  topological sorting, by the one or more processors, the directed acyclic graph;
  applying, by the one or more processors, copy operators in the one or more transformed operators to the pre-seeded database; and
  applying, by the one or more processors, the delete operators in the order of the topological sorted directed acyclic graph.

9. A system comprising one or more processors, the one or more processors configured to:
  receive a request from a requesting device in the test environment for selecting a pre-seeded database for use in performing an integration test of software, the pre-seeded database comprising one or more rows of data, the request further comprising one or more parameters defining the pre-seeded database;
  determine from a pool of one or more pre-seeded databases, that the pre-seeded database matches the one or more parameters within a predetermined tolerance;
  in response to the determination that the pool comprises the pre-seeded database matching the one or more parameters within the predetermined tolerance, assign the pre-seeded database to the requesting device, wherein assigning the pre-seeded database to the requesting device temporarily prevents use of the pre-seeded database by other devices until the pre-seeded database is released; and
  provide the data from the pre-seeded database in response to the request.

10. The system of claim 9, wherein the one or more processors are further configured to:
determine that the pool does not comprise the pre-seeded database, and in response, add a database matching the one or more parameters within the predetermined tolerance to the pool.

11. The system of claim 9, wherein the one or more processors are further configured to restore the pre-seeded database, the pre-seeded database modified at one or more rows of one or more tables, wherein in restoring the pre-seeded database the one or more processors are configured to restore, using a source copy of the pre-seeded database, only the one or more modified rows.

12. The system of claim 9, wherein the one or more processors are further configured to receive the request as part of a test environment start-up procedure.

13. The system of claim 9, wherein the one or more processors are further configured to:
receive a request for restoration of the pre-seeded database to a previous time, wherein the pre-seeded database has been modified since the previous time;
receive a changelog of modifications to the pre-seeded database;
identify, from the changelog, one or more operators applied to the pre-seeded database since the previous time;
transform, from the one or more operators, insert operators to delete operators, and delete or modify operators to copy operators; and
apply the transformed operators to the pre-seeded database.

14. The system of claim 13, wherein in receiving the changelog, the one or more processors are further configured to determine that the changelog is available, and wherein the one or more processors are further configured to:
in response to the determination that the changelog is not available, delete the pre-seeded database and re-create the pre-seeded database from a saved source copy of the pre-seeded database.

15. The system of claim 14, wherein in applying the one or more transformed operators, the one or more processors are configured to:
apply the transformed operators in parallel as groups based on common primary keys representing tables in the pre-seeded database targeted by the one or more transformed operators.

16. The system of claim 15, wherein in applying the one or more transformed operators, the one or more processors are configured to:
generate a directed acyclic graph of the tables corresponding to the common primary keys, wherein nodes of the directed acyclic graph represent the tables and edges of the directed acyclic graph represent dependencies between tables;
topological sort the directed acyclic graph;
apply copy operators in the one or more transformed operators to the pre-seeded database; and
apply the delete operators in the order of the topological sorted directed acyclic graph.

17. One or more non-transitory computer-readable storage media storing instructions that are operable, when executed by one or more processors, to cause the one or more processors to perform operations comprising:
receiving, by one or more processors, a request from a requesting device in the test environment for selecting a pre-seeded database for use in performing an integration test of software, the pre-seeded database comprising one or more rows of data, the request further comprising one or more parameters defining the pre-seeded database;
determining, by the one or more processors and from a pool of one or more pre-seeded databases, that the pre-seeded database matches the one or more parameters within a predetermined tolerance;
in response to the determination that the pool comprises the pre-seeded database matching the one or more parameters within the predetermined tolerance, assigning, by the one or more processors, the pre-seeded database to the requesting device, wherein assigning the pre-seeded database to the requesting device temporarily prevents use of the pre-seeded database by other devices until the pre- seeded database is released; and
providing, by the one or more processors, the data from the pre-seeded database in response to the request.

18. The computer-readable storage media of claim 17, wherein the operations further comprise:
determining, by the one or more processors, that the pool does not comprise the pre-seeded database, and in response, adding a database matching the one or more parameters within the predetermined tolerance to the pool.

* * * * *